(12) United States Patent
Brinkmann et al.

(10) Patent No.: US 11,447,038 B2
(45) Date of Patent: Sep. 20, 2022

(54) MOTOR VEHICLE COOLING SYSTEM AND CONTROL FOR COOLING A TRACTION BATTERY

(71) Applicant: FORD GLOBAL TECHNOLOGIES, LLC, Dearborn, MI (US)

(72) Inventors: Bernd Brinkmann, Dormagen (DE); Thomas Nitsche, Neuss (DE); Christian Jolk, Cologne (DE); Johann Wegers, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 305 days.

(21) Appl. No.: 16/839,773

(22) Filed: Apr. 3, 2020

(65) Prior Publication Data

US 2020/0317087 A1 Oct. 8, 2020

(30) Foreign Application Priority Data

Apr. 5, 2019 (DE) ...................... 10 2019 204 923.0

(51) Int. Cl.
*B60L 58/00* (2019.01)
*B60L 58/26* (2019.01)
(Continued)

(52) U.S. Cl.
CPC ............... *B60L 58/26* (2019.02); *B60K 6/28* (2013.01); *B60L 50/60* (2019.02);
(Continued)

(58) Field of Classification Search
CPC ............ H02M 10/613; H02M 10/625; H02M 10/633; B60L 58/26; B60L 58/24
See application file for complete search history.

(56) References Cited

U.S. PATENT DOCUMENTS 7,084,774 B2 * 8/2006 Martinez ............ B60H 1/00742
236/44 C
8,600,598 B2 * 12/2013 Simonini ................ B60L 58/24
701/22
(Continued)

FOREIGN PATENT DOCUMENTS

DE 102005023365 A1 11/2006
DE 102009046568 A1 5/2011
(Continued)

OTHER PUBLICATIONS

German Search Report for German Application No. DE 10 2019 204 923.0, Completed by the German Patent Office, dated Feb. 3, 2020, 8 pages.

*Primary Examiner* — Hau V Phan
(74) *Attorney, Agent, or Firm* — Brooks Kushman PC; David Kelley

(57) ABSTRACT

A method for operating a motor vehicle with a cooling system for cooling a traction battery may include receiving trip data representative of a planned route, reading in operating parameters of the traction battery, evaluating the trip data and the operating parameters to determine a set of data representative of a forecast temperature profile of the battery temperature, evaluating the set of data for the forecast temperature profile of the battery temperature to determine a phase of particularly high demand for cooling output while completing the route, buffer-storing (reducing) thermal energy while traveling the planned route by operating or increasing operation of the cooling system in anticipation of the high battery load to utilize heat storage capacity of the traction battery before the phase of particularly high cooling output demand.

19 Claims, 3 Drawing Sheets

(51) Int. Cl.
*B60L 50/60* (2019.01)
*B60K 6/28* (2007.10)
*H01M 10/613* (2014.01)
*H01M 10/633* (2014.01)
*H01M 10/625* (2014.01)

(52) U.S. Cl.
CPC ....... *H01M 10/613* (2015.04); *H01M 10/625* (2015.04); *H01M 10/633* (2015.04); *B60Y 2200/91* (2013.01); *B60Y 2200/92* (2013.01); *B60Y 2306/05* (2013.01); *H01M 2220/20* (2013.01)

(56) References Cited

U.S. PATENT DOCUMENTS

| | | | |
|---|---|---|---|
| 8,935,029 B2 * | 1/2015 | Sabrie | H01M 10/6563 165/41 |
| 9,105,951 B2 * | 8/2015 | Anderson-Straley | H01M 10/613 |
| 9,764,618 B2 * | 9/2017 | Miller | B60H 1/00964 |
| 2012/0025762 A1 | 2/2012 | Lienkamp et al. | |
| 2014/0012445 A1 | 1/2014 | Fleckenstein et al. | |
| 2014/0277869 A1 | 9/2014 | King et al. | |
| 2014/0375277 A1 | 12/2014 | Yan et al. | |
| 2015/0100188 A1 | 4/2015 | Wagner et al. | |
| 2015/0283874 A1 * | 10/2015 | Seitz | B60H 1/00271 62/118 |
| 2017/0282677 A1 | 10/2017 | Eisele et al. | |
| 2018/0117984 A1 * | 5/2018 | Kim | B60H 1/00899 |
| 2018/0141552 A1 * | 5/2018 | Marcicki | H01M 10/625 |

FOREIGN PATENT DOCUMENTS

| | | |
|---|---|---|
| DE | 102013207535 A1 | 10/2014 |
| DE | 102014201062 A1 | 7/2015 |
| DE | 102016216778 A1 | 3/2018 |
| WO | 2016083529 A1 | 6/2016 |

* cited by examiner

MOTOR VEHICLE COOLING SYSTEM AND CONTROL FOR COOLING A TRACTION BATTERY

CROSS-REFERENCE TO RELATED APPLICATIONS

This application claims foreign priority benefits under 35 U.S.C. § 119(a)-(d) to DE Application 10 2019 204 923.0 filed Apr. 5, 2019, which is hereby incorporated by reference in its entirety.

TECHNICAL FIELD

The disclosure relates to a motor vehicle cooling system and control for cooling a traction battery.

BACKGROUND

A traction battery (also referred to as a traction accumulator, drive battery or deep cycle battery) is an energy store which is used for driving electric vehicles or hybrid electric vehicles and consists of a number of interconnected elements. It consists of a small number to thousands of accumulator cells or cell blocks interconnected in parallel and in series.

During the charging of the traction battery with electrical energy, thermal energy is generated. Thermal energy is also generated when drawing electrical energy, for example while driving. Therefore, such motor vehicles have a cooling system for cooling the traction battery. An energy exchange takes place by way of coolants, air or refrigerants. However, the maximum possible heat exchange is restricted by structural conditions. Such cooling systems are known for example from DE 10 2014 204 260 A1, DE 10 2012 204 410 A1 and DE 10 2009 046 568 A1.

The efficiency of drawing energy from the traction battery depends on several parameters, such as the charging state, temperature level or electrical power taken. Generally, the efficiency is around 85% to 95%; in the case of rapid charging (the trend in the industry is toward values of over 150 kW) and in the case of high-load driving conditions (for example heavy vehicles driving uphill, maximum speed, racetrack driving), a particularly great amount of thermal energy is generated in the traction battery. In this case, the amount of thermal energy exceeds the capability of the cooling system.

The capability of the cooling system is limited by the capacity of a heat exchanger and also by a heat transfer surface and heat transfer coefficient between the traction battery and a cooling system. As soon as the battery temperature has reached a predetermined temperature limit, a battery management system (BMS) correspondingly reduces the permissible amount of energy that can be taken or supplied.

Even after a short time, this leads to a reduced charging rate and reduced capacity. In particular in the case of heavy vehicles with a high air resistance (for example a truck with a loading area of a large frontal area) and/or a high total weight, the limitation of the battery may already be reached after a few minutes of driving uphill.

There is therefore a need to show ways in which the operation of a motor vehicle with a cooling system for cooling a traction battery can be improved.

SUMMARY

Embodiments according to the present disclosure may include a method for operating a motor vehicle with a cooling system for cooling a traction battery, comprising a controller receiving trip data associated with a planned route and operating parameters of the traction battery, evaluating the trip data and the operating parameters to determine a set of data representative of a forecast temperature profile of the traction battery temperature, evaluating the set of data for the forecast temperature profile of the traction battery temperature to determine a phase of cooling demand output exceeding an associated threshold while completing the route, and buffer-storing cold energy while traveling the planned route by utilizing heat storage capacities of the traction battery before the phase of cooling output demand exceeding the threshold for providing the required battery power during the phase of high load demand, if a phase of particularly high cooling output demand while completing the route has been determined.

As such, according to one or more embodiments, before the beginning of the actual journey, it is determined on the basis of a forecast temperature profile whether the possibility of exceeding a predetermined temperature limit for the battery temperature exists or is likely. If this is the case, a cooling strategy for operating the cooling system is determined to provide cooling energy that can be buffer-stored to reduce the anticipated peak cooling demand to a value below the cooling capacity of the system at the anticipated peak power demand from the battery. In this way, the operation of a motor vehicle with a cooling system for cooling a traction battery can be improved.

According to one embodiment, a battery temperature profile associated with the phase of particularly high cooling output demand is determined, and a starting time for activating the cooling system is determined by evaluating at least the anticipated peak battery temperature and duration. The battery temperature profile and associated cooling system activation is analysed on the basis of reliably preventing exceeding of a predetermined temperature limit for the battery temperature. Then the time from which the cooling system is activated is determined. In this way, the cooling system can be operated in a particularly simple manner.

According to a further embodiment, a required battery temperature to which the traction battery is cooled down before the phase of particular demand is determined. Also in this way, the cooling system can be operated in a particularly simple manner.

According to a further embodiment, a vehicle weight is determined while traveling a section of the planned route, by evaluating vehicle operating parameters. In this way, the current vehicle weight in dependence on loading of the motor vehicle can be taken into account. In this way, the control of the cooling system of a motor vehicle for cooling a traction battery can be further improved.

Various embodiments may include a motor vehicle having a traction battery and cooling system control, a method for controlling a cooling system of an electrified vehicle, a computer program product having stored data including instructions for controlling such a system, and, a control unit or controller configured to control a cooling system as described with respect to any one or more embodiments disclosed herein.

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
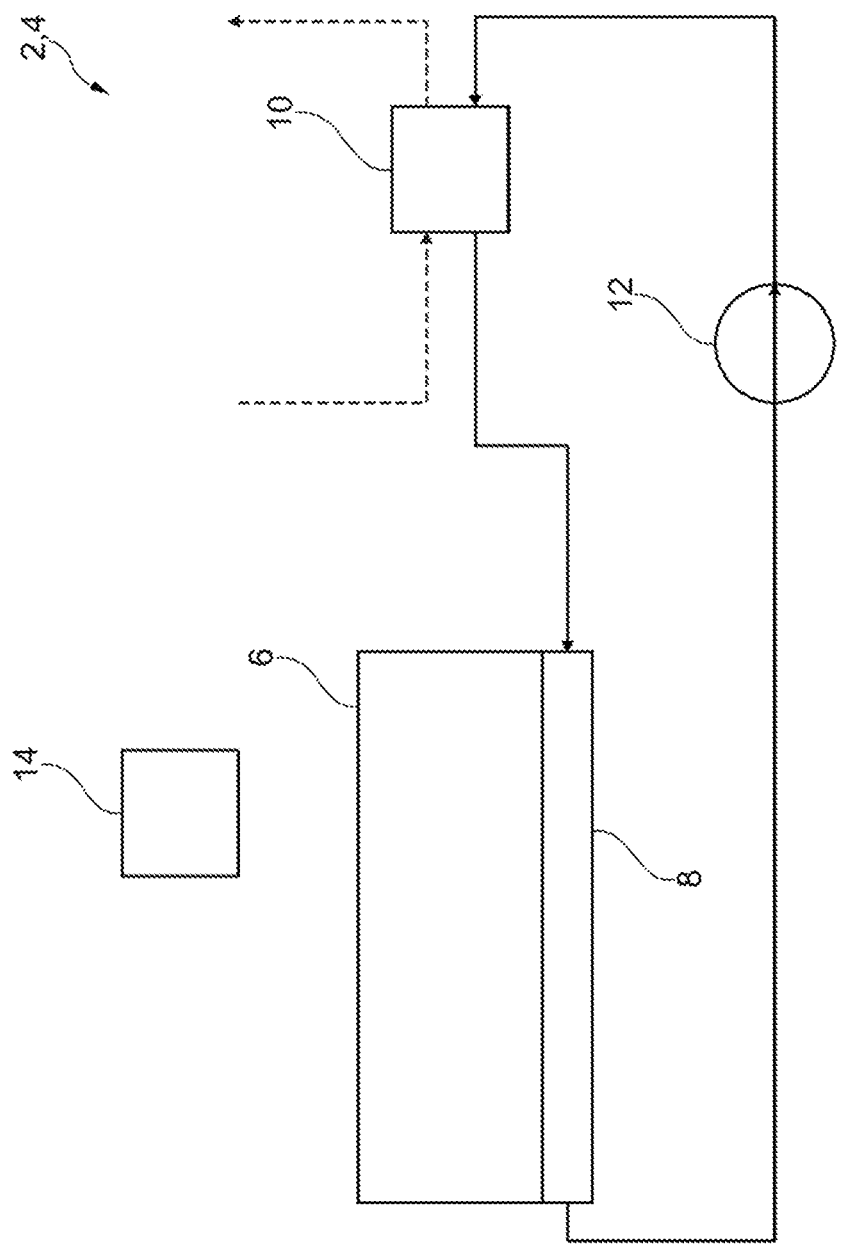
FIG. 1 shows components of a cooling system for cooling a traction battery in a schematic representation.

Reference is first made to FIG. 1. Components of a cooling system 4 for cooling a traction battery 6 of a motor vehicle 2 are shown. The motor vehicle 2 may be designed as an electric vehicle or hybrid electric vehicle. The motor vehicle 2 may also be designed as an automobile, such as for example as a delivery van, or as a truck for transporting goods. Of the components of the cooling system 4, a cooler 8, a heat exchanger 10 and a pump 12 as well as the lines connecting them in a liquid-carrying manner are shown.

The cooler 8 is in heat-transferring connection with the traction battery 6 in order to cool it when required. By way of a feed line, the cooler 8 is fed a coolant, which, after it has been warmed up in the cooler 8, is discharged through a discharge line. The feed line and the discharge line each end at the heat exchanger 10.

In other words, the cooler 8 and the heat exchanger 10 together with the feed line and the discharge line form a coolant circuit. A coolant circulation can be produced by means of the pump 12, which in the present representative embodiment is assigned to the discharge line. The heat exchanger 10 is in turn connected in a liquid-carrying manner to further feed and discharge lines, in order to discharge thermal energy.

A control unit 14 of a battery management system (BMS) in this case activates the cooling system 4 during operation in order to ensure that there is no overheating of the traction battery 6 due to a maximum operating temperature being exceeded. Those of ordinary skill in the art will recognize that other vehicle controllers may perform some or all of the functions described as being performed by the BMS controller in the representative embodiment either alone or in combination.

In the representative embodiment illustrated, the control unit 14 is designed to receive trip data representative of a planned route, in particular representative of sections with one or more inclines that meet predetermined criteria for distance and/or grade/slope. In addition, controller or control unit 14 may receive and/or monitor operating parameters of the traction battery 6, in particular parameters representative of the storage and heat capacity thereof. The control unit 14 is also designed to evaluate the trip data before the beginning of actually traveling the route and the anticipated values for the system operating parameters in order to determine a set of data representative of a forecast temperature profile $T_{vor}$ of the battery temperature T.

Furthermore, the control unit 14 is designed to evaluate the set of data of the forecast temperature profile $T_{vor}$ of the battery temperature T in order to determine a phase I along the route, such as for example a part of the journey on a section with a significant incline (such as a 6% grade, for example), on which there will be a corresponding demand for battery discharge, with an accompanying significant cooling demand for the traction battery 6.

In other words, the control unit 14 determines a required battery temperature $T_{erf}$ for the phase I and, by evaluating relevant influencing variables, the control unit 14 estimates a starting time SZP for activating the cooling system 4.

Consequently, during operation, while traveling the planned route, cold energy is buffer-stored before the provision phase I by utilizing heat storage capacities of the traction battery 6 and then has the effect during the phase I that exceeding of the maximum operating temperature is prevented. Stated differently, the cooling system is operated In addition, the control unit 14 is designed for determining a vehicle weight of the motor vehicle 2 while traveling a section of the planned route, such as for example a section at the beginning of the journey, by evaluating vehicle operating parameters. For example, the cooling system is operated to cool the traction battery to a lower temperature than would otherwise be provided for operating on a generally flat route in anticipation of the increased battery power demand and associated cooling demand to prevent the battery from exceeding a predetermined maximum temperature, or taking other limiting measures that may impact drivability, such as reducing maximum speed.

For these and the subsequently described tasks and/or functions, the control unit 14 may have hardware and/or software components.

Figure 2:
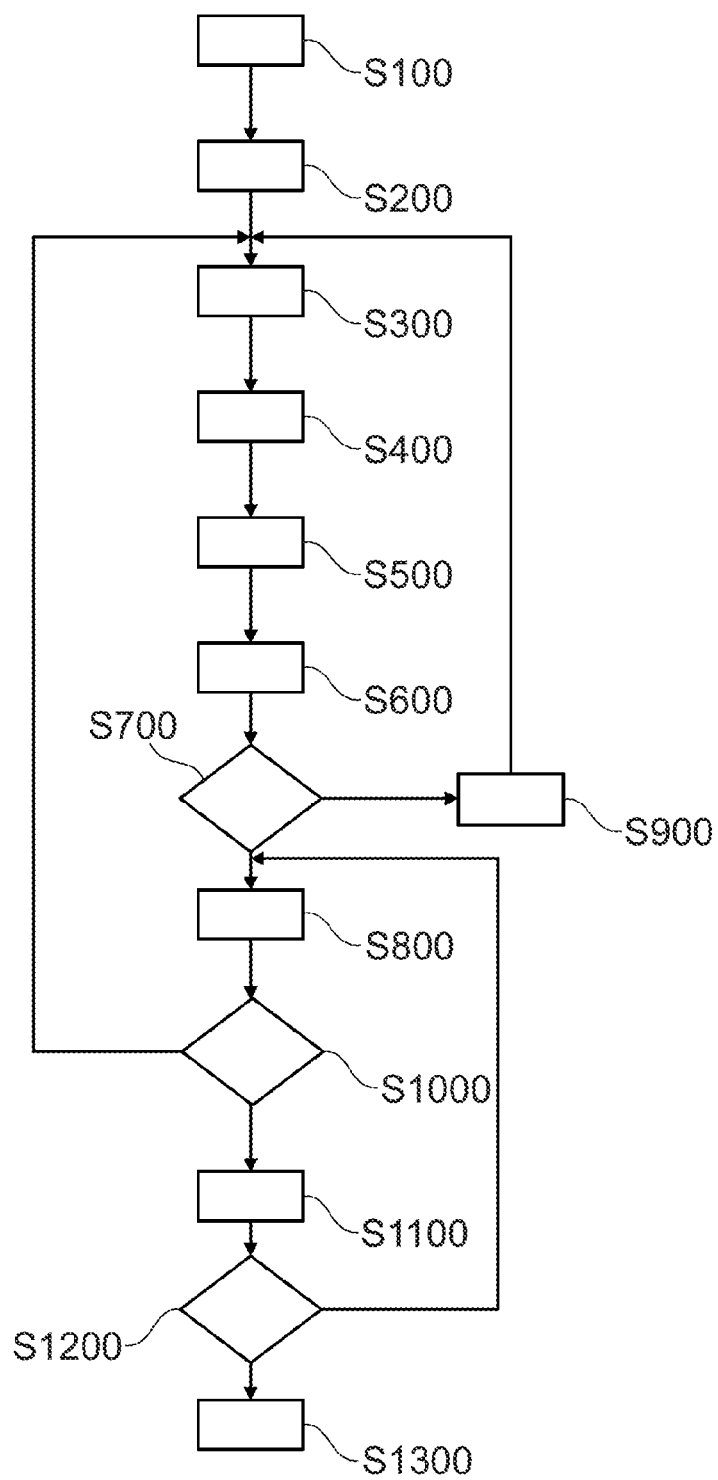
FIG. 2 shows a flow diagram of operation of a system or method for cooling a traction battery of an electrified vehicle.

Operation of a system or method for controlling an electrified vehicle is illustrated with respect to a representative method sequence is explained with additional reference to FIG. 2. At S100, the controller receives trip data presentative of a planned route, such as from a driver entering trip data by way of an HMI, which is connected in a data transmitting manner to a navigation system of the motor vehicle 2. The trip data are then read in by the control unit 14 and may be stored in an associated non-transitory memory or other computer readable storage device.

At S200, the control unit 14 receives further parameters, such as for example values for the drag coefficient, the frontal area (force of air resistance), the tire size and the rolling resistance (force of rolling resistance). Furthermore, efficiency tables for the drive components, the traction battery 6 and the drive train and also values for the thermal capacity of the traction battery 6 and for other important subsystems may be read in, such as also model-based descriptions of the cooling system and the power circuits, calibrating strategies for use of the cooler, the fan control, etc.

The control unit 14 reads in data representative of an actual position of the motor vehicle 2, the battery charging state and the battery temperature of the traction battery 6, other relevant parameters such as component and fluid temperatures, values for the tire pressure and the vehicle weight, on the basis of the average weight that has been determined in earlier, similar journeys as represented at S300.

At S400, the control unit 14 determines the vehicle weight while traveling a section of the planned route, in the present representative embodiment during the first few kilometers. For this purpose, a drive power equation for accelerations on a level road or for a constant incline of the road is used. If the motor vehicle 2 is a delivery van, a new calculation is advisable periodically depending on the particular application, such as after each "official" stop during a delivery journey, in order to establish whether the vehicle weight has changed.

At S500, the control unit 14 reads in further data representative of the planned route, such as for example road data including the incline or gradient, road condition and size, traffic situation, roadworks as well as weather data, including temperature, rain and snow forecast, as well as the wind direction and strength. At S600, the control unit 14 evaluates the data read in and determines a forecast temperature profile $T_{vor}$ of the battery temperature T. Furthermore, in the present representative embodiment, the control unit 14 determines a vehicle speed, a battery charging state and the battery temperature T along the route.

At S700, the control unit 14 checks whether there is a phase I along the route in which values according to the forecast temperature profile $T_{vor}$ of the battery temperature T are compared with a predetermined temperature limit $T_{Limit}$. If the forecast battery temperature according to the forecast temperature profile $T_{vor}$ along the route lies below a predetermined temperature limit $T_{Limit}$, in the present representative embodiment 45° C., no further measure is required. At S800, in which the current battery temperature T is compared with the respective temperature value according to the forecast temperature profile $T_{vor}$ at the respective position along the route. If, on the other hand, the forecast battery temperature according to the forecast temperature profile $T_{vor}$ along the route lies above the predetermined temperature limit $T_{Limit}$, the method is continued with at S900.

At S900, for each section of the route in which the forecast temperature profile $T_{vor}$ exceeds the predetermined temperature limit $T_{Limit}$, the respective battery temperature $T_{vor}$ required at the beginning of phase I in order to keep the battery temperature T below the predetermined temperature limit $T_{Limit}$ is determined. By evaluating the battery temperature $T_{erf}$ and other relevant parameters, a starting time SZP for starting the cooling system 4 is then determined. By including navigation data, the position along the route at which the cooling system must be activated in order to avoid exceeding the temperature limit of the battery can then be determined.

By means of various simplifications, the required battery temperature $T_{erf}$ at the beginning of phase I can be determined as follows:

$$T_{erf} = T_{Limit} - \frac{T_{max} - T_{Limit}}{1 - \frac{\alpha * A * i}{c_p * m}}$$

$T_{Limit}$ is the maximum permissible battery temperature. $T_{max}$ is the forecast maximum battery temperature. α is the convective heat transfer coefficient between the battery and the cooling system. A is the heat-transferring surface area between the battery and the cooling system. i is the time period of the phase I. $c_p$ is the specific heat capacity of the battery. m is the mass of the battery.

By means of various simplifications, the required time for switching on the cooling system SZP can be determined as follows:

$$SZP = USZP - \frac{c_p * m * (T_{SW} - T_{erf})}{Q_{Batt} - \alpha * A * \left(\frac{T_{SW} + T_{erf}}{2} T_{Cool}\right)}$$

USZP is the original switching-on time of the cooling system. $T_{SW}$ is the limit temperature of the battery, which, when exceeded during normal operation, brings about switching on of the battery cooling system. $Q_{batt}$ is the average flow of heat that the battery generates in a time period before phase I. $T_{cool}$ is the average coolant temperature when the cooling system is active.

At S1000, the current battery temperature T is compared with the respective temperature value according to the forecast temperature profile $T_{vor}$.

If the current battery temperature T is greater than the temperature value according to the forecast temperature profile $T_{vor}$, the method is continued at S300. In the present representative embodiment, it is provided that a safety factor, for example 3C, is taken into account, i.e. the method is then continued at S300 if the difference obtained from the current battery temperature T and the temperature value according to the forecast temperature profile $T_{vor}$ is greater than 3° C. Otherwise, the method is continued at S1100.

At S1100, the control unit 14 waits for a predetermined time period. The length of the predetermined time period may however also be dependent on the difference obtained from the current temperature value T and the temperature value according to the forecast temperature profile T as well as the predetermined temperature limit $T_{Limit}$.

At S1200, it is checked whether or not the journey was completed within the predetermined time period. If the journey is not completed within the predetermined time period, the method is continued with the step S800. Otherwise, the method is continued at S1300 where the determined values and parameters are archived.

Figure 3:
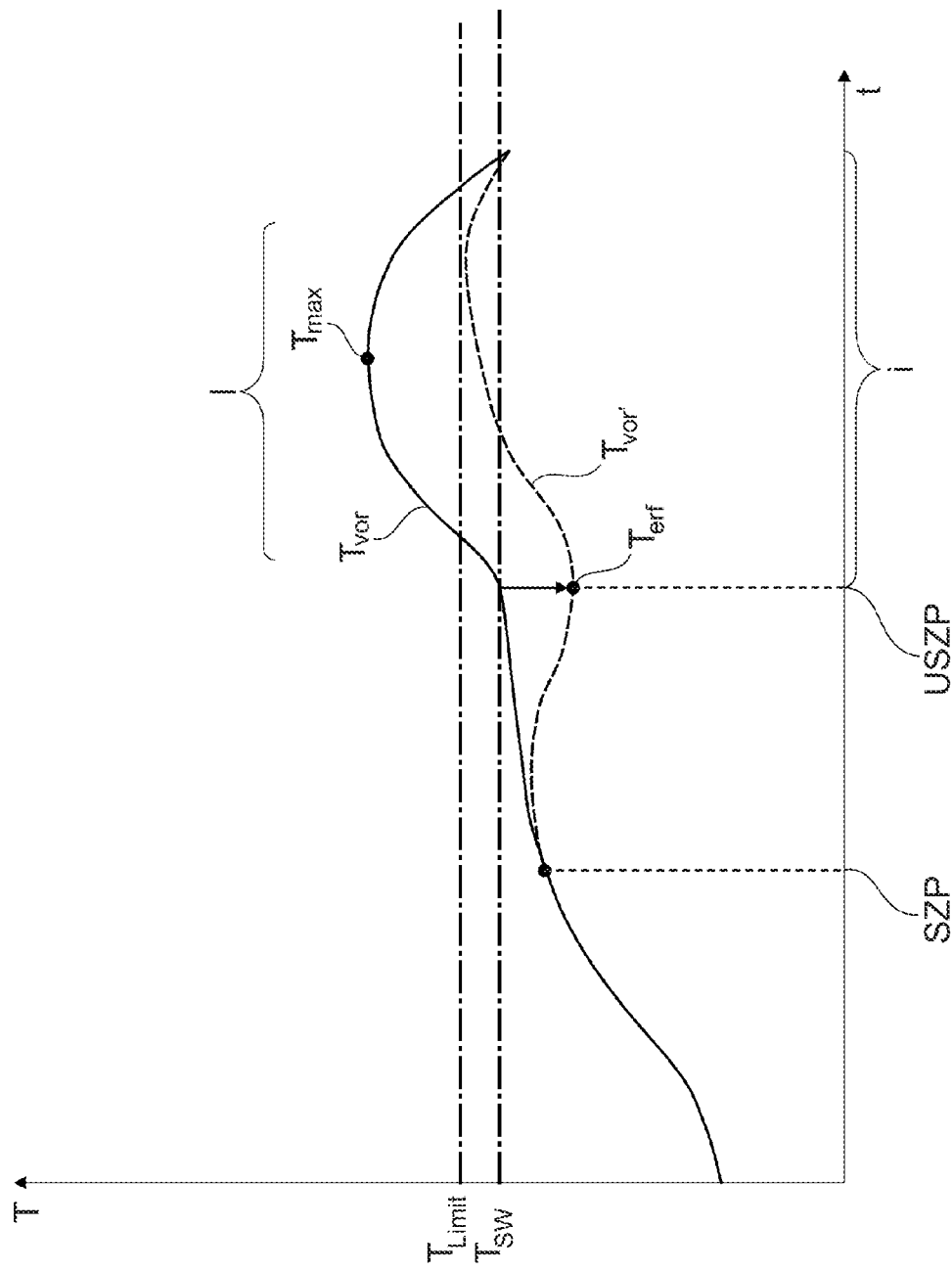
FIG. 3 shows various temperature values and profiles during operation of a representative embodiment of an electrified vehicle having cooling system control according to the disclosure.

Reference is now additionally made to FIG. 3. Shown by way of example is a profile of the battery temperature T with respect to the time t, to be precise the forecast temperature profile $T_{vor}$ and the forecast temperature profile after revision $T_{vor'}$. Also depicted are the temperature limit $T_{Limit}$ and a switching threshold $T_{SW}$ for the activation of the cooling system 4.

It can be seen that, according to the forecast temperature profile $T_{vor}$, exceeding of the temperature limit $T_{Limit}$ occurs. This is the case even if the cooling system 4 is activated when the switching threshold $T_{SW}$ is exceeded. This time is indicated in FIG. 3 as USZP. In other words, the region in which exceeding of the temperature limit $T_{Limit}$ occurs may be regarded as a phase I along the route during which there is a demand for a particularly high cooling output that the cooling system 4 is unable to provide.

According to the method, the cooling system 4 is already activated at the starting time SZP. In this way, the battery temperature T is cooled down to the value of the required battery temperature $T_{erf}$ and the forecast temperature profile after revision $T_{vor'}$ is established.

In this way, cold energy is buffer-stored while traveling the planned route by utilizing heat storage capacities of the traction battery 6 before the phase I and then ensures during the phase I that no exceeding of the temperature limit $T_{Limit}$ occurs. In this way, the operation of the motor vehicle 2 with the cooling system 4 for cooling the traction battery 6 can be improved.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly illustrated or described.

What is claimed is:

1. A method for controlling an electrified vehicle having a traction battery configured to propel the vehicle and a cooling system configured to cool the traction battery, the method comprising:
   receiving, by a vehicle controller, trip data representative of a planned route for the electrified vehicle;
   generating, by the vehicle controller, a forecast temperature profile of the traction battery having estimated battery temperature as a function of the planned route based on the trip data and battery operating parameters; and
   in response to the estimated battery temperature exceeding an associated temperature threshold for at least one point on the planned route, determining a cooling point along the planned route prior to the at least one point, and controlling the cooling system to increase cooling of the battery beginning at the cooling point to maintain actual battery temperature below the estimated battery temperature for the at least one point on the planned route.

2. The method of claim 1 wherein the cooling point determined by the controller is based on at least a traction battery heat capacity.

3. The method of claim 2 wherein the cooling point determined by the controller is determined using a weight of the electrified vehicle.

4. The method of claim 3 further comprising determining, by the controller, the weight of the electrified vehicle during operation of the electrified vehicle along a portion of the planned route.

5. The method of claim 1 wherein determining the cooling point comprises determining a required battery temperature at the cooling point to prevent the actual battery temperature from exceeding the associated temperature threshold based on the estimated battery temperature, a heat transfer coefficient between the battery and the cooling system, a heat-transferring surface area between the battery and the cooling system, a time period for controlling increased cooling, a specific heat capacity of the battery, and mass of the battery.

6. The method of claim 1 wherein determining the cooling point comprises determining a required battery temperature at the cooling point to prevent the actual battery temperature from exceeding the associated temperature threshold according to:

$$T_{erf} = T_{Limit} - \frac{T_{max} - T_{Limit}}{1 - \frac{\alpha * A * i}{c_p * m}}$$

where $T_{Limit}$ represents the associated temperature threshold, $T_{max}$ represents the estimated battery temperature, $\alpha$ represents a heat transfer coefficient between the battery and the cooling system, A represents a heat-transferring surface area between the battery and the cooling system, i represents a time period for controlling increased cooling, $c_p$ represents specific heat capacity of the battery, and m represents mass of the battery.

7. The method of claim 1 wherein determining the cooling point comprises, determining, by the controller, determining a cooling time according to:

$$SZP = \frac{c_p * m * (T_{SW} - T_{erf})}{Q_{Batt} - \alpha * A * \left(\frac{T_{SW} + T_{erf}}{2} - T_{Cool}\right)}$$

where $T_{SW}$ represents a second battery temperature threshold that activates the cooling system, $T_{erf}$ represents battery temperature at the cooling point, $\alpha$ represents a heat transfer coefficient between the battery and the cooling system, A represents a heat-transferring surface area between the battery and the cooling system, $c_p$ represents specific heat capacity of the battery, m represents mass of the battery $Q_{batt}$ represents average flow of heat that the battery generates in a time period before the cooling point, and $T_{cool}$ represents average coolant temperature when the cooling system is active.

8. The method of claim 1 wherein the electrified vehicle comprises a hybrid vehicle having an internal combustion engine.

9. A method for operating a motor vehicle having a traction battery and a cooling system for cooling the traction battery, the method comprising:
   receiving, by a vehicle controller, trip data associated with a planned route having a battery load demand exceeding a load threshold and operating parameters of the traction battery;
   evaluating the trip data and the operating parameters to determine a set of data representative of a forecast temperature profile of the traction battery;
   evaluating the set of data for the forecast temperature profile of the traction battery temperature to determine a phase of cooling demand output exceeding an associated threshold while completing the planned route; and
   buffer-storing thermal energy by controlling the cooling system while traveling the planned route by utilizing heat storage capacity of the traction battery before the phase of cooling output demand exceeding the threshold for providing required battery power when the battery load demand exceeds the load threshold.

10. The method of claim 9 further comprising determining a required battery temperature to which the traction battery is cooled before reaching a point on the planned route wherein the battery load demand exceeds the load threshold.

11. The method of claim 9 further comprising determining weight of the motor vehicle while traveling a section of the planned route.

12. The method of claim 11 wherein the weight of the motor vehicle is determined by comparing measured vehicle operating parameters along the section of the planned route to previously stored vehicle operating parameters.

13. A vehicle comprising:
   a traction battery configured to propel the vehicle;
   a cooling system configured to cool the traction battery; and
   a controller configured to:
      receive trip data representative of a planned route for the vehicle;
      generate a forecast temperature profile of the traction battery having estimated battery temperature as a function of the planned route based on the trip data and battery operating parameters; and
      in response to the estimated battery temperature exceeding an associated temperature threshold for at least one point on the planned route, determine a cooling point along the planned route prior to the at least one point, and control the cooling system to increase cooling of the battery beginning at the cooling point to maintain actual battery temperature below the estimated battery temperature for the at least one point on the planned route, wherein the controller is configured to determine the cooling point using at least a weight of the vehicle.

14. The vehicle of claim 13 wherein the controller is further configured to determine the cooling point based on at least a traction battery heat capacity.

15. The vehicle of claim 13 wherein the controller is further configured to determine the weight of the vehicle during operation of the vehicle along a portion of the planned route.

16. The vehicle of claim 13 wherein the controller is further configured to determine the cooling point by determining a required battery temperature at the cooling point to prevent the actual battery temperature from exceeding the associated temperature threshold based on the estimated battery temperature, a heat transfer coefficient between the battery and the cooling system, a heat-transferring surface area between the battery and the cooling system, a time period for controlling increased cooling, a specific heat capacity of the battery, and mass of the battery.

17. The vehicle of claim 13 wherein the controller is configured to determine the cooling point by determining a required battery temperature at the cooling point to prevent the actual battery temperature from exceeding the associated temperature threshold according to:

$$T_{erf} = T_{Limit} - \frac{T_{max} - T_{Limit}}{1 - \frac{\alpha * A * i}{c_p * m}}$$

where $T_{Limit}$ represents the associated temperature threshold, $T_{max}$ represents the estimated battery temperature, $\alpha$ represents a heat transfer coefficient between the battery and the cooling system, A represents a heat-transferring surface area between the battery and the cooling system, i represents a time period for controlling increased cooling, $c_p$ represents specific heat capacity of the battery, and m represents mass of the battery.

18. The vehicle of claim 13 wherein the controller is configured to determine the cooling point by determining a cooling time according to:

$$SZP = \frac{c_p * m * (T_{SW} - T_{erf})}{Q_{Batt} - \alpha * A * \left(\frac{T_{SW} + T_{erf}}{2} - T_{Cool}\right)}$$

where $T_{SW}$ represents a second battery temperature threshold that activates the cooling system, $T_{erf}$ represents battery temperature at the cooling point, $\alpha$ represents a heat transfer coefficient between the battery and the cooling system, A represents a heat-transferring surface area between the battery and the cooling system, $c_p$ represents specific heat capacity of the battery, m represents mass of the battery $Q_{batt}$ represents average flow of heat that the battery generates in a time period before the cooling point, and $T_{cool}$ represents average coolant temperature when the cooling system is active.

19. The vehicle of claim 13 further comprising an internal combustion engine.

* * * * *